United States Patent [19]

Yamada

[11] 4,305,094
[45] Dec. 8, 1981

[54] COLOR CONTROL SIMULATOR FOR A PICTURE REPRODUCING MACHINE

[75] Inventor: Mitsuhiko Yamada, Kyoto, Japan

[73] Assignee: Dainippon Screen Seizo Kabushiki Kaisha, Japan

[21] Appl. No.: 102,136

[22] Filed: Dec. 10, 1979

[30] Foreign Application Priority Data

Dec. 11, 1978 [JP] Japan .............................. 53-155954

[51] Int. Cl.³ .............................................. H04N 1/46
[52] U.S. Cl. ...................................................... 358/80
[58] Field of Search ............................. 358/80, 75, 78

[56] References Cited

U.S. PATENT DOCUMENTS

| | | | |
|---|---|---|---|
| 3,893,166 | 7/1975 | Pugsley | 358/80 |
| 4,092,668 | 5/1978 | Knop | 358/80 |
| 4,097,892 | 6/1978 | Balding | 358/80 |
| 4,127,871 | 11/1978 | Sakamoto | 358/80 |

*Primary Examiner*—Richard Murray
*Attorney, Agent, or Firm*—Marvin H. Kleinberg

[57] ABSTRACT

A color control simulator for a picture reproducing machine, comprising an operational processor including a program having the same operational functions, but not the same operational circuits, as those of the picture reproducing machine, and adjusting means for adjusting color control conditions for the picture reproducing machine, which correspond to those of the picture reproducing machine. A color picture signal picked up is separated into color separation analog signals in a color separator, and then color separation digital signals, and the color separation digital signals are operated in the operational processor to obtain the color control conditions by the adjusting means. The color control conditions may be recorded in a card or a tape in output display means.

6 Claims, 12 Drawing Figures

COLOR CONTROL SIMULATOR FOR A PICTURE REPRODUCING MACHINE

BACKGROUND OF THE INVENTION

This invention relates to a color control simulator for a picture reproducing machine, and more particularly to a color control simulator for obtaining proper color control conditions such as density correction, color correction, gradation correction and output intensity correction for a picture reproducing machine for making color separation printing plates.

In the prior art, a picture signal picked up from an original picture is separated into color separation signals of primary colors such as red, green and blue, and then the color separation signals are controlled in order to obtain color control conditions in a picture reproducing machine such as a color scanner. The color control conditions for the picture reproducing machine depend on fundamental conditions such as color balance, highlight and shadow densities of an original picture, requests from clients, and so forth, and thus they are determined by an operator according to his experiences by controlling adjusting means such as potentiometers.

However, it is very difficult to set up the color control conditions of a particular picture, for example, seasonable impressions such as autumn tints, and cherry blossoms, and recollection images in mind such as skin of a man, a grass blade, and sky. Hence, the color control conditions are set up while the output values of the picture reproducing machine are observed through a monitor.

When such a particular finish different from a standard one is required, as is often the case, the setup of the color control conditions for the particular picture involves time investment. Further, an unexpected color image is often obtained owing to a mistake of the operator, characteristics of the picture reproducing machine, or the like.

In order to overcome the aforementioned disadvantages, a machine for setting up color control conditions has been developed, wherein in order to reduce the manual steps as far as possible, the fundamental conditions of a standard picture are input into a computer and are operated therein, thereby obtaining the color control conditions, and wherein the adjusting means are automatically set up according to the color control conditions obtained.

Such a machine is effectively operated when a standard finish is required from a standard picture. However, this machine need the measurement of the density values and so forth, corresponding to highlight and shadow points on the picture as the fundamental conditions of the picture. Accordingly, as is often the case, pictures having no distinct highlight and/or shadow points cannot be processed by this machine.

In the conventional machine, the characteristic differences among the picture reproducing machines to be used are not considered, and thus the picture reproducing machines cannot be used to best effect in parallel with this conventional machine. Consequently, in this case, a particular picture apart from the standard one is processed, the color control conditions of the picture which is mounted to the picture reproducing machine should be determined by adjusting the adjusting means while the output values of the picture reproducing machine are monitored, and, on this occasion, nobody knows how much such an adjustment affects the portions other than the standard points of the adjustment, which is an inconvenient situation.

Meanwhile, a color control simulator having the same operational circuits or systems as those used in the picture reproducing machine, has been proposed, wherein the color control conditions to be input to the picture reproducing machine are determined by an operator while monitoring the output values. In this case, this simulator includes the same color control circuits or systems as those of the picture reproducing machine as if another picture reproducing machine were provided, and thus avoids the high cost of acquiring such a machine, only for the adjusting function.

SUMMARY OF THE INVENTION

Therefore, it is an object of the present invention to provide a color control simulator for a picture reproducing machine, free from the abovementioned disadvantages, which is compact, simple and low-priced.

According to the present invention there is provided a color control simulator for a particular, desired picture reproducing machine, comprising: a color separator which picks up a picture signal from an original picture and separates it into color separation analog signals which are adapted to be converted into color separation digital signals; an operational processor including a program having the same operational functions as those of the desired picture reproducing machine, which operates upon the color separation digital signals in order to obtain the color control conditions for the desired picture reproducing machine; and adjusting means for adjusting the color control conditions, which adjusting means correspond to those of the desired picture reproducing machine.

BRIEF DESCRIPTION OF THE DRAWINGS

In order that the present invention may be better understood, preferred embodiments thereof will now be described with reference to the accompanying drawings, in which.

DESCRIPTION OF PREFERRED EMBODIMENTS

Figure 1:
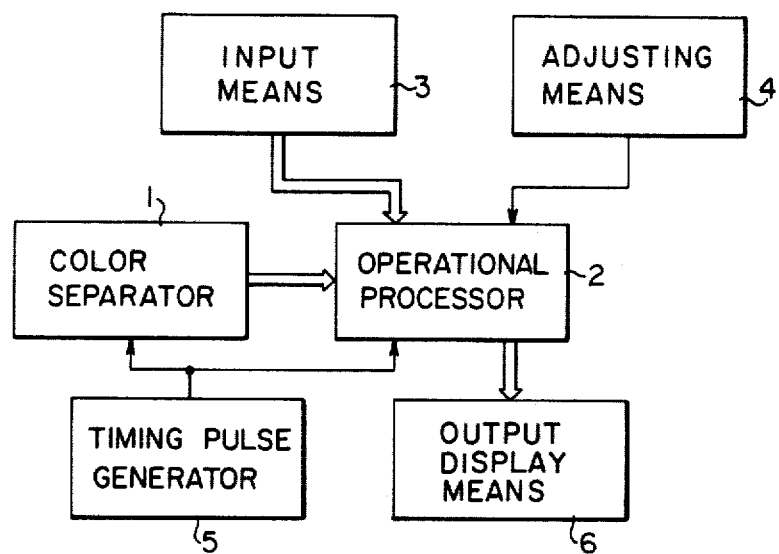
FIG. 1 is a block diagram of a color control simulator according to the present invention.

Referring now to the drawings, in which the same numerals refer to the same parts through the various figures, there is shown in FIG. 1 a color control simulator for obtaining proper color control conditions for a picture reproducing machine, according to the present invention, comprising a color separator 1 which separates a color picture signal picked up at certain points of an original picture into color separation signals of primary colors such as red, green and blue; an operational processor 2 which generally comprises a digital computer, and generates color control conditions for the picture reproducing machine according to the fundamental conditions of the original picture; input means 3 such as a keyboard, a tape reader, or the like, for a computer, which sends supplemental data to the operational processor 2; adjusting means 4 such as digital switches, combinations of potentiometers and analog-digital converters, or the like, for adjusting the color control conditions, which correspond to those of the picture reproducing machine; a timing pulse generator 5 which controls the timing of the system and sends timing pulses to the color separator 1 and the operational processor 2; and output display means 6 which is provided in case of need, such as a card printer, a tape printer, a character writer, cassette tape, or the like, which displays or records the color control conditions set up. In this embodiment, it is not necessary to scan the entire surface of the original picture, but only to sample certain significant points thereof.

Figure 2:
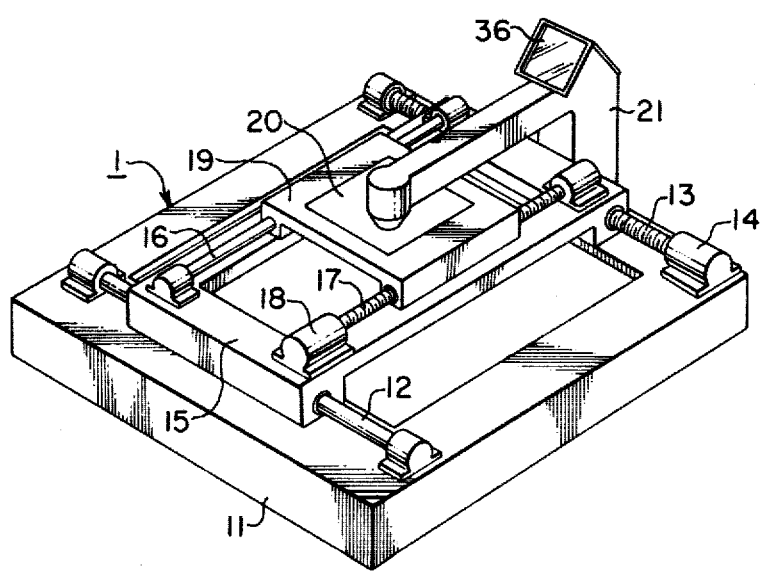
FIG. 2 is a perspective view of a color separator of FIG. 1.
Figure 3:
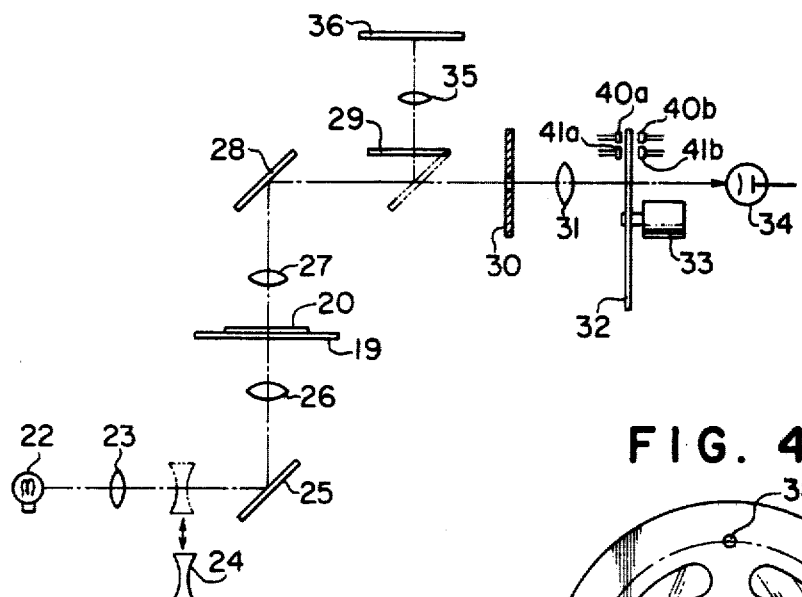
FIG. 3 is schematic view of an optical system in the color separator in FIG. 2.
Figure 4:
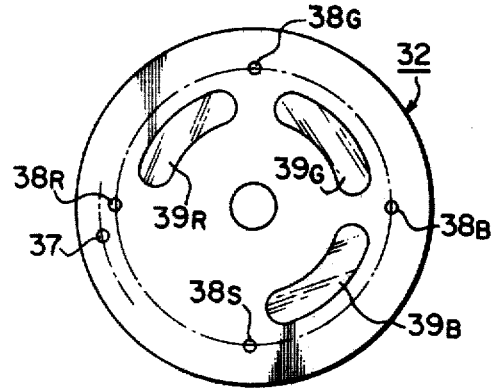
FIG. 4 is an elevational view of a rotary plate of a color separator device of a color separator of FIGS. 2 and 3.

In FIGS. 2-4 there is shown one embodiment of the color separator 1 of FIG. 1. On opposite ends of the base plate 11 are mounted a guide rod 12 and a screw rod 13 which are arranged in parallel. The screw rod 13 is driven by a motor 14. A movable plate 15 is slidably mounted onto the guide rod 12 and the screw rod 13, and is moved along them by the motor 14. The movable plate 15 is provided with a second guide rod 16 and a screw rod 17 which is driven by a motor 18.

A picture support table 19 is slidably mounted to the second guide rod 16 and the screw rod 17 and is movable along them. The original picture 20 is mounted to the picture support table 19. A pickup means 21 is mounted to the end of the base plate 11. In this embodiment, linear encoders may be disposed to the base plate 11 and the movable plate 14 in parallel with the screw rods 13 and 17 in order to detect and signal the coordinates of the various pickup points.

In FIG. 3 is shown an optical system of the color separator 1, which, as a matter of fact, is arranged within the pickup means 21. To the picture 20 on the table 19 is projected a light generated from a light source 22 through a relay lens 23, a mirror 25, and a condenser lens 26 along the light axis. The light passes through the picture 20 and then passes through a pickup lens 27, a mirror 28, an aperture 30, a condenser lens 31, a rotary plate 32 of a color separation device 33 to a photoelectric element 34 along the light axis. While the illustrated device works best with transparencies, it may be necessary to modify the structure in order to use prints.

When a scale change lens 24 is put into the light path along the light axis between the relay lens 23 and the mirror 25, and a pivot mirror 29 is turned down a certain angle between the mirror 28 and the aperture 30, as shown in FIG. 3 by broken lines, the light from the picture 20 is focused to a screen glass 36 via the pickup lens 27, the mirrors 28 and 29 and a focusing lens 35, and thus the enlarged color image on the screen glass 36 can be observed. This is conveniently used for positioning the pickup point.

Figure 5:
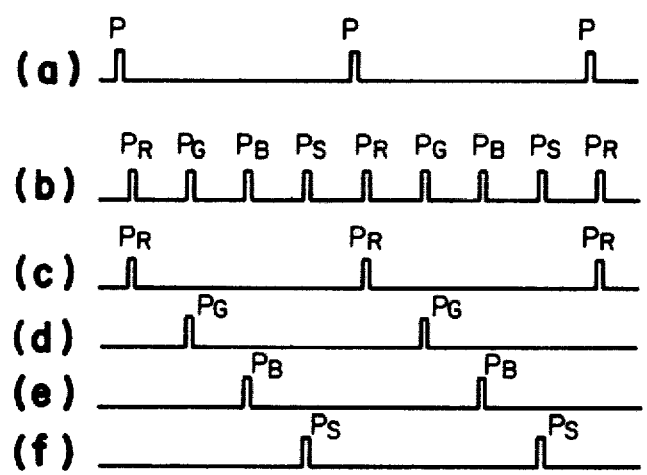
FIG. 5 is a time chart of timing pulses generated by the color separator device of FIG. 3.

The rotary plate 32 includes an small hole 37 for a standard position timing pulse P, and four small holes 38R, 38G, 38B, 38S for three position detecting timing pulses $P_R$, $P_G$, $P_B$ for color separation signals of red, green and blue, and an operation start timing pulse $P_S$ at a certain angular distance, on two coaxial circles, respectively. Two rows, illustrating standard standard position timing pulses P and position detecting timing pulses $P_R$, $P_G$, $P_B$, and operation start timing pulses $P_S$ are shown in FIG. 5a, 5b. The latter four timing pulses are further separated into four rows of the timing pulses, as shown in FIG. 5c, 5d, 5e, 5f.

The rotary plate 32 includes also three color separation filters 39R, 39G, 39B for red, green and blue colors each extending some distance therebetween along another coaxial circle inside the circle defined by the holes 38R, 38G, 38B, 38S.

When the light from the picture 20 passes through the color separation filters 39R, 39G, 39B of the rotary plate 32 while the rotary plate 32 is rotated, the light is sequentially separated into three primary color components such as red, green and blue. The color separated light components are sequentially received by the photoelectric element 34. In response to the color separation light components, the photoelectric element 34 outputs successive color separation analog signals R, G, B.

Two pairs of light source 40a and 41a and photoelectric elements 40b and 41b, which face each other, are so arranged of opposite surface sides of the rotary plate 32 that, while the plate rotates, the photoelectric elements 40b and 41b may receive the lights from the light sources 40a and 41a only through the holes 37, 38R, 38G, 38B 38S. The timing pulses consecutively generated in rows are shown in a time chart in FIG. 5.

In this embodiment, the light sources and the photoelectric elements 40a and 40b; 41a and 41b, and the rotary plate 32 constitute the timing pulse generator 5 in FIG. 1.

The color separation analog signals R, G, B which are output from the photoelectric element 34 are converted into density analog signals in a conventional manner (not shown). Then these color separation density analog signals are converted into density digital signals in an analog-digital converter (not shown) in synchronization with the timing pulses $P_R$, $P_G$, $P_B$.

The color separation density digital signals $R_1$, $G_1$, $B_1$ are fed to the operational processor 2 in FIG. 1, and the operation is started therein in synchronization with the timing pulse $P_S$, as hereinafter described.

Figure 6:
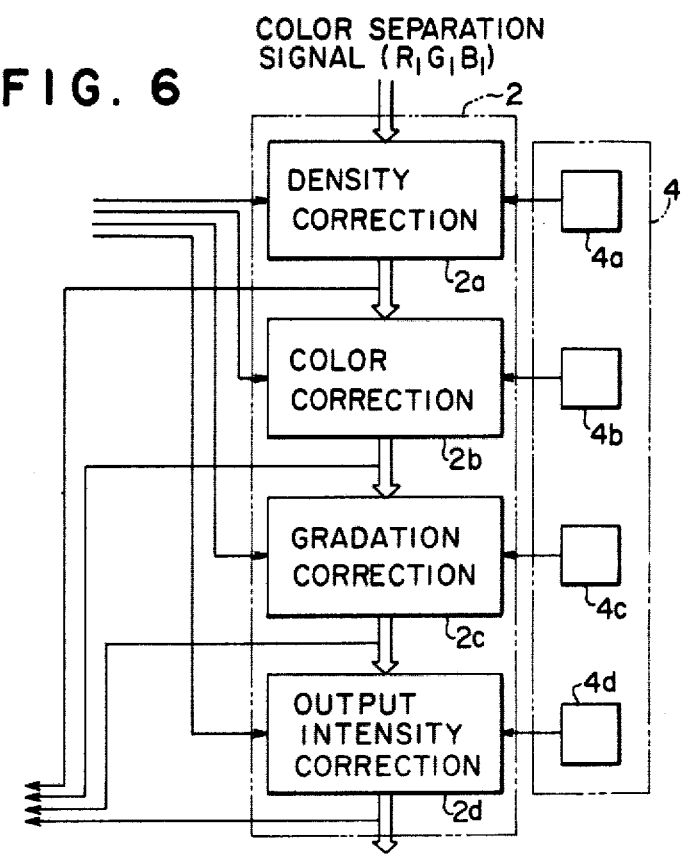
FIG. 6 is a block diagram of an operational processor and adjusting means shown in FIG. 1.

As shown in FIG. 6, the operational processor 2 includes the same operational functions such as density correction 2a, color correction 2b, gradation correction 2c, and output intensity correction 2d, but not the same operational circuits or systems, as those of the picture reproducing machine with which the color control simulator of the present invention is intended to function. The Operational Processor 2 operates consecutively to perform the four correction steps. As a matter of fact, the adjusting means 4 comprise four separate means 4a, 4b, 4c and 4d to make the four corrections.

Such four operational steps described hereinafter are programmed in the operational processor 2, and supplemental data is input to the operational processor 2 from the input means 3. The color control conditions output from the processor 2 are sent to the output display means 6, and are recorded there.

First, the density correction step is operated in order to control the density ranges of the color separation density signals $R_1$, $G_1$, $B_1$, between the highlight and the shadow points in the original picture, to their reproducible density ranges, i.e. the input density ranges of the color correction step followed. This will be described with reference to one of color separation density signals. The same operation is repeated for each of the color separation density signals.

Figure 7:
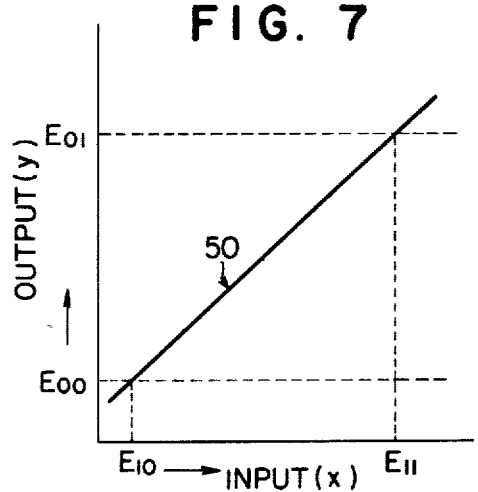
FIG. 7 is a graph for explaining density correction.

In FIG. 7, there is shown an equation expressed as a line 50, for linearly transforming the density range, having an input-output characteristics represented by $Y=aX+b$, wherein X is an input density and Y is an output density. The density range to be transformed is changed by varying a and b. The values a and b of $Y=aX+b$ are so set that the lower and the upper limits $E_{10}$ and $E_{11}$ of the input density range which is varied, may correspond to those limits $E_{00}$ and $E_{01}$ of the output density range, which is fixed.

Figure 8:
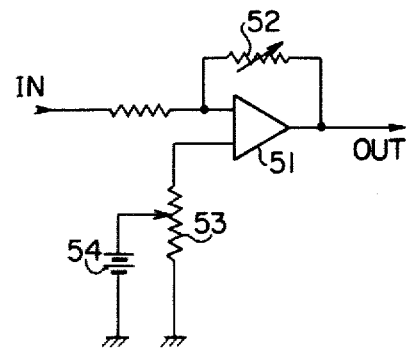
FIG. 8 shows an analog circuit for the density correction.

In the prior art, this is performed by an analog circuit, a typical one of which is shown in FIG. 8, comprising an operational amplifier 51, two potentiometers 52 and 53, and an electric source 54. The values a and b of the equation $Y=aX+b$ are set up by the potentiometers 52 and 53.

Figure 9:
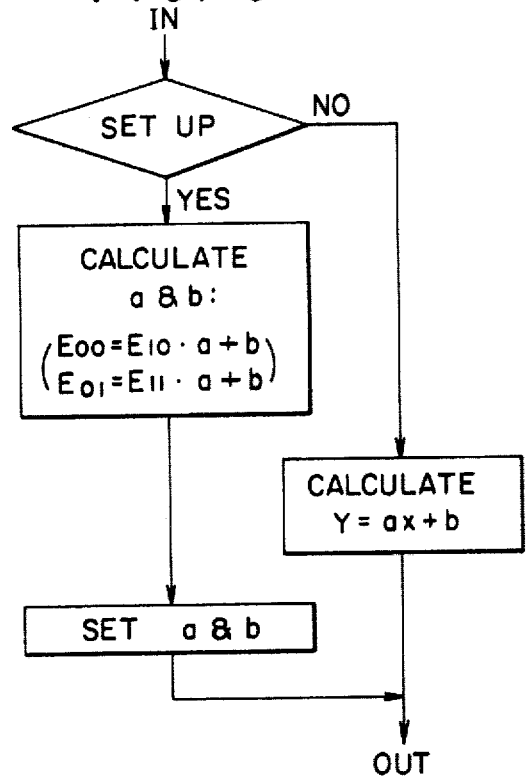
FIG. 9 is a flow chart for carrying out the density correction in a digital manner.

According to the present invention, the values a and b of the equation $Y=aX+b$ are manually set up by adjusting means 4a such as a digital switch, a combination of potentiometer and analog-digital converter, or the like, in a digital way, and then the output density Y is calculated. The value a and b of $Y=aX+b$ may be also calculated according to the following equations;

$$E_{00}=E_{10}\cdot A+b$$

$$E_{01}=E_{11}\cdot a+b$$

and depending on the values a and b obtained, the adjusting means 4a may be automatically set up. This process is shown in a flow chart in FIG. 9.

Second, the color correction step is operated so as to reproduce the faithful colors of the original picture or the desired colors.

The basic masking color correction of the density corrected color separation signals $R_2$, $G_2$, $B_2$ output from the density correction step is first carried out in a digital manner to obtain color separation reproducing signals C, M, Y, K for cyan, magenta, yellow and black according to the following equations which are well-known, $$C = Max + k_1(Max - B) + k_2(Max - G) - k_3(Max - R)$$

$$M = Max + k_4(max - B) - k_5(Max - G) + k_6(Max - R)$$

$$Y = Max - k_7(Max - B) + k_8(max - G) + k_9(Max - R)$$

wherein Max means the maximum value of the color separation signals $R_2$, $G_2$, $B_2$, and $k_1$-$k_9$ are fixed numbers.

Then, the color separation reproducing signals C, M, Y are separated into six color separation signals m, o, y, g, c, and v for magenta, orange, yellow, green, cyan, and violet according to the following equations;

$$m = [(Y-C)_+ + (M-Y)_-]_+$$

$$o = [(M-Y)_+ + (Y-C)_-]_+$$

$$y = [(C-M)_+ + (Y-C)_-]_+$$

$$g = [(Y-C)_+ + (C-M)_-]_+$$

$$c = [(M-Y)_+ + (C-M)_-]_+$$

$$v = [(C-M)_+ + (M-Y)_-]_+$$

wherein suffix + or − means the selection of the positive or negative signal component, of which detail is disclosed in the Japanese Patent Publication No. 50-14845.

The color correction of the color separation reproducing signals C, M, Y, K are performed by adding such six color separation signals m, o, y, g, c, v, thereto according to the following equations, and thereby obtaining color-corrected reproducing signals $C_1$, $M_1$, $Y_1$, $K_1$.

$$C_1 = C + m\cdot C_M + o\cdot C_O + y\cdot C_Y + g\cdot C_G + c\cdot C_C + v\cdot C_V$$

$$M_1 = M + m\cdot M_M + o\cdot M_O + y\cdot M_Y + g\cdot M_G + c\cdot M_C + v\cdot M_V$$

$$Y_1 = Y + m\cdot Y_M + o\cdot Y_O + y\cdot Y_Y + g\cdot Y_G + c\cdot Y_C + v\cdot Y_V$$

$$K_1 = K + m\cdot K_M + o\cdot K_O + y\cdot K_Y + g\cdot K_G + c\cdot K_C + v\cdot K_V$$

In these equations, $C_M$, $C_O$, $C_Y$, $C_G$, $C_C$, $C_V$, $M_M$, $M_O$, $M_Y$, ... $K_G$, $K_C$, and $K_V$ are weight or coefficient signals for each color separation signals m, o, y, g, c, and v, each of which may be produced by a combination of a potentiometer which outputs a positive or negative voltage, and an analog-digital converter which converts the positive or negative voltage into the weight signal. Consequently, the color correction is carried out by the adjusting means 4b, i.e. such 24 potentiometers for the weight signals.

Third, the gradation correction step is operated in order to control the gradations of the color-corrected reproducing signals $C_1$, $M_1$, $Y_1$, $K_1$. This step will be described in connection with one of the color-corrected reproducing signals. The same operation is repeated for each of the color-corrected reproducing signals.

Figure 10:
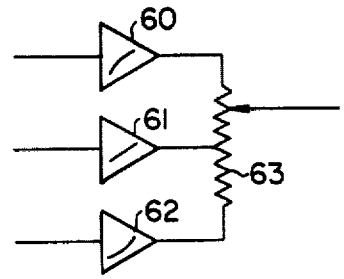
FIG. 10 shows an analog circuit for the gradation correction.
Figure 11:
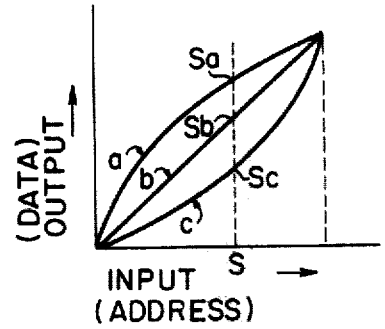
FIG. 11 is a graph which shows tables of input-output characteristics for the gradation correction.

In a conventional apparatus, the gradation correction is performed by an analog circuit shown in FIG. 10, which comprises three operational amplifiers 60, 61 and 62, each having logarithmic, linear and exponential output characteristics respectively corresponding to output characteristics lines a, b, c of the gradation tables shown in FIG. 11. A potentiometer 63 connected to the analog circuit of FIG. 10. This analog circuit outputs a signal generally having a characteristics composed of two of the three output characteristics lines a, b, c.

According to the present invention, the gradation correction is carried out in a digital manner. Three tables each having the output characteristics line a, b or c, shown in FIG. 11 are prepared in the operational processor 2. The adjusting means 4c having a scale with consecutive numbers 0–10, for instance, which may be a digital switch or a combination of a potentiometer and an analog-digital converter, is operated manually. The output characteristics lines a, b, and c correspond to the setup number 0, 5 and 10 of the scale of the adjusting means 4c. That is, when the adjusting means is set up to 0, 5 or 10, the signal on the output characteristics line a, b or c is output.

If the color corrected reproducing signal $C_1$, $M_1$, $Y_1$, or $K_1$ is input into the tables while the tables are addressed by an address S, as shown in FIG. 11, the tables 5 output signals Sa, Sb and Sc, respectively. When a setup number N of the scale of the adjusting means is 0, 5 or 10, the signal Sa, Sb or Sc is output as a gradation corrected reproducing signal $C_2$, $M_2$, $Y_2$, or $K_2$, as described above. Hence, when the setup number N of the scale of the adjusting means is between 0 and 5 or 5 and 10, the output signal $S_{out}$, i.e. the gradation corrected reproducing signal $C_2$, $M_2$, $Y_2$ or $K_2$ is calculated by the following equations:

$$0 < N < 5: S_{out} = N/5 \times Sb + (5-N)/5 \times Sa$$

$$5 < N < 10: S_{out} = (N-5)/5 \times Sc + (10-N)/5 \times Sb$$

As apparent from the abovementioned, the gradation correction is performed as follows: When the color corrected reproducing signal $C_1$, $M_1$, $Y_1$ or $K_1$ is input to the tables, the setup number of the scale of the adjusting means 4c is first read, two of the signals Sa, Sb and Sc are selected depending on the number read out, and then the calculation is carried out, as described above, thereby obtaining the gradation corrected reproducing signal $C_2$, $M_2$, $Y_2$ or $K_2$.

Finally, the output intensity correction step is operated.

In the picture reproducing machine, when the voltage range of the gradation corrected reproducing signals is 0–5, and the output voltage range of the output intensity correction is 0–2, the input voltage range 0–5 must be transformed linearly to the output voltage 0–2 in the output intensity correction circuit. Furthermore, the output voltage range of the output intensity correction circuit is often shifted by the change of the light intensity, and so forth. This shift of the output voltage range must be corrected. These corrections are carried out in the same manner as the color density correction described above by the analog circuit shown in FIG. 8, in the picture reproducing machine.

According to the present invention, the output intensity correction, i.e. the linear transformation of the gradation corrected reproducing signals $C_2$, $M_2$, $Y_2$, $K_2$ is performed according to an equation $Y = a_1 X + b_1$ in the same manner as that of the density correction step described above, thereby obtaining color controlled reproducing signals $C_3$, $M_3$, $Y_3$, $K_3$. Hence, the detailed explanation of the output intensity correction may be omitted so as to avoid the repetition of the explanation. In this case, however, the values $a_1$ and $b_1$ of $Y = a_1 X + b_1$ are always adjusted manually, that is, by the adjusting means 4d such as digital switches or combinations of potentiometers and analog-digital converters, for four colors such as cyan (C), magenta (M), yellow (Y) and black (K).

As apparent from the above description, all of the color control conditions are set up by the adjusting means 4a, 4b, 4c and 4d.

When the picture reproducing machine is operated, the corresponding adjusting means thereof to those of the color control simulator of the present invention are adjusted in the same setup positions as the adjusting means 4a, 4b, 4c and 4d, thereby obtaining the desired color separation printing plates.

In case of need, the setup positions of the adjusting means 4a, 4b, 4c and 4d may be recorded in a card, a tape, or the like, as numerical values in the output display means 6. The picture reproducing machine may be controlled directly by such a card or a tape in which the color control conditions are recorded.

Further, the coordinates of the pickup positions on the original picture may be written in the output display means 6 together with the color control conditions, and when the picture reproducing machine is operated, these coordinates may be used as standard position in order to obtain more correct setup points.

Figure 12:
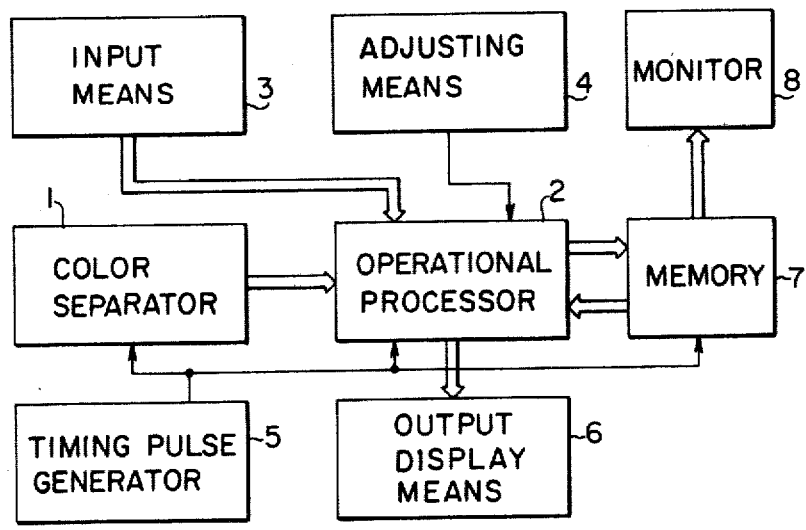
FIG. 12 is a block diagram of another color control simulator according to the present invention.

In FIG. 12 there is shown another color control simulator according to the present invention, which is almost the same as the first embodiment described above except that a memory 7 and a monitor 8 such as a color cathode ray tube (CRT) are further provided.

In this embodiment, the entire surface of the original picture is scanned photoelectrically by the color separator 1 in order to obtain color separation signals R, G, B. Then the color separation signals are processed through the operational processor 2 to output the color controlled reproducing signals $C_3$, $M_3$, $Y_3$, $K_3$ in the same manner as the first embodiment.

Then, the color controlled reproducing signals $C_3$, $M_3$, $Y_3$, $K_3$ output from the operational processor 2 are stored in the memory 7. These stored signals are read out from the memory 7 in synchronization with first reading timing pulses generated from the timing pulse generator 5, and are sent to the monitor 8 in which the color controlled reproducing signals are converted into the color separation signals R, G, B by which the color controlled picture image is displayed therein. On the other hand, the color controlled reproducing signals are read out from the memory 7 in synchronization with second reading timing pulses generated from the timing pulse generator 5, and are fed again to the operational processor 2 in order to carry out again the color control operation such as the density correction, color correction, gradation correction and output intensity correction, by adjusting means 4a, 4b, 4c and 4d, as described above.

Since the operation speed of the color control operation of the color separation signals in the operational processor 2 is slower than that in the monitor 8, the read-out speed of the second reading timing pulses is slower than that of the first reading timing pulses.

The color controlled reproducing signals whose color is controlled again, are stored again in the same addresses of the memory 7 in synchronization with writing timing pulses generated from the timing pulse generator 5. Then, the color controlled reproducing signals stored in the memory 7 are read out again and are sent to the monitor 8 in order to display the picture image of the desired color.

The conversion of the color controlled reproducing signals, $C_3$, $M_3$, $Y_3$, $K_3$ into the color separation signals R, G, B are carried out in the monitor in a conventional manner, of which detail is described in the Japanese Patent Laying-Open Specification No. 49-40819 (Japanese Patent Application No. 47-84634).

According to the present invention, the operational processor 2 may include a program which is capable of outputting the numerals to be adjusted in order to adjust the adjusting means to their setup positions depending on the comparisons between the desired color control conditions input from the input means 3 prior to the operation, and the corresponding color separation signals which are obtained by picking up the original picture by means of the pickup head of the color separator 1.

Although the present invention has been shown and described in terms of preferred embodiments thereof in connection with the accompanying drawings, various changes and modifications can be made by those skilled in the art without departing from the spirit of the present invention.

What is claimed is:

1. For use in conjunction with a predetermined, color corrected picture reproducing machine, a color control simulator of the picture reproducing machine, comprising:

a color separator adapted to scan and pick up a picture signal from an original picture and separate the picture into color separation analog signals which are converted into corresponding color separation digital signals;

an operational processor equivalent to that of the predetermined picture reproducing machine operating under a preselected program for processing the color separation digital signals to generate color correction digital signals in order to obtain desired color control conditions for the picture reproducing machine; and adjusting means for adjusting the color control conditions, in the simulator in a form and format compatible with and corresponding to those of the picture reproducing machine for enabling rapid setup of a picture reproducing machine to create color separations of the original picture.

2. A simulator according to claim 1, further comprising a memory which stores color-controlled signals output from the operational processor, and a monitor for displaying a picture so color-controlled, wherein the color-controlled signals stored in the memory are read out to the monitor for the display and to the operational processor for further color control, and the re-color-controlled signals are written again in the same addresses of the memory.

3. A simulator according to claim 1, wherein said program comprises the algorithms for carrying out density correction, color correction, gradation correction and output intensity correction, and signals applied to the operational processor result in settings compatible with the picture reproducing machine to obtain the color control conditions.

4. A simulator according to claim 3, wherein the color control conditions are recored on a recording medium in output display means.

5. A color control simulator according to claim 1 wherein said color separator comprises only one photo responsive element for detecting signals from an original picture and is adapted to operate with selectively placed color filters to provide input analog signals.

6. A color control simulator according to claim 1, further including a monitor for displaying a picture substantially identical to the final output of a picture reproducing machine operating under the color control conditions produced by said simulator.

* * * * *